United States Patent
Ozawa et al.

(10) Patent No.: US 8,654,359 B2
(45) Date of Patent: Feb. 18, 2014

(54) APPARATUS, METHOD AND RECORDING MEDIUM FOR DETERMINING DOCUMENT PREVIEW MODES

(75) Inventors: Kaitaku Ozawa, Itami (JP); Kei Shigehisa, Amagasaki (JP); Takeshi Morikawa, Takarazuka (JP); Toshimichi Iwai, Katsuragi-gun (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1068 days.

(21) Appl. No.: 12/417,413

(22) Filed: Apr. 2, 2009

(65) Prior Publication Data

US 2009/0310174 A1      Dec. 17, 2009

(30) Foreign Application Priority Data

Jun. 11, 2008   (JP) .................................. 2008-153606

(51) Int. Cl.
  *G06F 3/12*      (2006.01)
(52) U.S. Cl.
  USPC ........................................................ 358/1.13
(58) Field of Classification Search
  USPC ........................................................ 358/1.15
  See application file for complete search history.

(56) References Cited

U.S. PATENT DOCUMENTS 7,774,853 B2 * 8/2010 Yoshida ........................... 726/28
7,992,188 B2 * 8/2011 Ohta et al. ......................... 726/1
2003/0179871 A1 * 9/2003 Ito et al. ...................... 379/93.24
2006/0036934 A1 * 2/2006 Fujiwara ......................... 715/500
2006/0074913 A1 * 4/2006 O'Sullivan et al. ............... 707/9

FOREIGN PATENT DOCUMENTS

| JP | 5-153370 | 6/1993 |
| JP | 7-74902 | 3/1995 |
| JP | 8-340431 | 12/1996 |
| JP | 9-261428 | 10/1997 |
| JP | 2002-244977 | 8/2002 |
| JP | 2003-264661 | 9/2003 |
| JP | 2003-273954 | 9/2003 |
| JP | 2006-163288 | 6/2006 |
| JP | 2006-215681 | 8/2006 |

OTHER PUBLICATIONS

Japanese Notification of Reasons for Refusal mailed Apr. 27, 2010, directed to counterpart Japanese Application No. 2008-153606; 4 pages.

* cited by examiner

*Primary Examiner* — Benny Q Tieu
*Assistant Examiner* — Sunil Chacko
(74) *Attorney, Agent, or Firm* — Morrison & Foerster LLP

(57) ABSTRACT

A selector selects one or more than one document files among those recorded in a memory, according to an instruction issued by a user, and a judgment portion judges whether by the simplified mode or the detailed mode the selected document file data should be outputted, according to an output condition that is determined in advance. And then, according to the judgment result, an output portion is controlled so that the selected document file could be outputted by the simplified mode or the detailed mode.

11 Claims, 11 Drawing Sheets

Here, you can specify an assistance display setting.
Please select "drawing" or "abstract".

Drawing

Abstract

FIG. 1 1 A

Please select a BOX,
then press the "assistance function" button.

BOX-A

BOX-B

BOX-C

⋮

Assistance Function

FIG. 1 1 B

APPARATUS, METHOD AND RECORDING MEDIUM FOR DETERMINING DOCUMENT PREVIEW MODES

This application claims priority under 35 U.S.C. §119 to Japanese Patent Application No. 2008-153606 filed on Jun. 11, 2008, the entire disclosure of which is incorporated herein by reference in its entirety.

BACKGROUND OF THE INVENTION

1. Field of the Invention

The present invention relates to a data processing apparatus such as an image processing apparatus, a data processing method and a computer readable recording medium having a data processing program recorded therein to make a computer execute a data processing program by the data processing method.

2. Description of the Related Art

The following description sets forth the inventor's knowledge of related art and problems therein and should not be construed as an admission of knowledge in the prior art.

As disclosed in Japanese Unexamined Laid-open Patent Publications No. 2006-215681, H9-261428, H8-340431, 2006-163288 and etc., there are certain apparatuses having a so-called "assistance function" enabling them to display an explanatory comment about document files recorded in a memory, heretofore known as data processing apparatuses such as image forming apparatuses, and thereby users are required only to select a document file without the need to open the document file after selecting, to know about the document file.

Specifically, some of the apparatuses display a brief comment about a selected document file or the beginning part of a selected document file and some of the apparatuses display only a part of a selected document file in a predetermined manner, which are heretofore known. Furthermore, some of the apparatuses read out by voice a text portion of a selected document file so as to let visually-disabled users know about the document file, which are also heretofore known.

However, these conventional data processing apparatuses having the assistance function display the content of a selected document file, only briefly. Thus, brief display by using the assistance function is convenient for users who already know about the document file, but not convenient very much for users who do know about the document file.

When users would like to know further about the document file, they have to perform an operation to disable the assistance function for example, which is troublesome.

Furthermore, when users try to find out a preferable document file among those recorded in his/her own personal memory area, they are required to select the document files one by one so that only a part of the document files could be displayed by using the assistance function, which is also troublesome.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an objective of the present invention to provide a data processing apparatus that is capable of changing a data output format depending on users or etc. when a document file recorded in a memory area is outputted by using the assistance function.

It is another objective of the present invention to provide a data processing method that is capable of changing a data output format depending on users or etc. when a document file recorded in a memory area is outputted by using the assistance function.

It is yet another objective of the present invention to provide a computer readable recording medium having a data processing program stored therein to make a computer implement the data processing method.

It is still yet another objective of the present invention to provide a data processing apparatus that does not require users to select document files recorded in a memory area, one by one, when the users try to find out a preferable document file among those recorded therein, by using the assistance function.

It is further still yet another objective of the present invention to provide a data processing method that does not require users to select document files recorded in a memory area, one by one, when the users try to find out a preferable document file among those recorded therein, by using the assistance function.

It is further still yet another objective of the present invention to provide a computer readable recording medium having a data processing program stored therein to make a computer implement the data processing method.

According to a first aspect of the present invention, a data processing apparatus comprises:
- a memory that records in itself one or more than one document files;
- a selector that selects a document file among those recorded in the memory, according to an instruction issued by a user;
- an output portion that is capable of outputting document files;
- a judgment portion that judges whether by the simplified mode or the detailed mode the document file selected by the selector should be outputted, according to an output condition that is determined in advance; and
- a controller that makes the output portion output the selected document file by the simplified mode or the detailed mode, according to the judgment result drawn by the judgment portion.

According to a second aspect of the present invention, a data processing apparatus comprises:
- a memory that records in itself one or more than one document files;
- a selector that selects a document file among those recorded in the memory, according to an instruction issued by a user who accesses from an external apparatus;
- a transmitter that transmits document files to the external apparatus;
- a judgment portion that judges whether by the simplified mode or the detailed mode the document file selected by the selector should be transmitted to the external apparatus, according to a type of the external apparatus; and
- a controller that makes the transmitter transmit the selected document file to the external apparatus by the simplified mode or the detailed mode, according to the judgment result drawn by the judgment portion.

According to a third aspect of the present invention, a data processing apparatus comprises:

a memory that having one or more than one memory areas in which one or more than one document files are recorded;

a selector that selects a memory area among those existing in the memory, according to an instruction issued by a user;

an output portion that is capable of outputting document files; and a controller that makes the output portion output only a part of respective document files recorded in the memory area that is selected by the selector, in the list format, according to a condition that is determined in advance.

According to a fourth aspect of the present invention, a data processing method comprises:

selecting one or more than one document files among those recorded in a memory, according to an instruction issued by a user;

judging whether by the simplified mode or the detailed mode the selected document file should be outputted, according to an output condition that is determined in advance; and outputting the selected document file by the simplified mode or the detailed mode, according to the judgment result.

According to a fifth aspect of the present invention, a data processing method comprises:

selecting one or more than one document files among those recorded in a memory, according to an instruction issued by a user who accesses from an external apparatus;

judging whether by the simplified mode or the detailed mode the selected document should be transmitted to the external apparatus, according to a type of the external apparatus; and transmitting the selected document to the external apparatus by the simplified mode or the detailed mode, according to the judgment result.

According to a sixth aspect of the present invention, a data processing method comprises:

selecting a memory area among one or more than one memory areas in which one or more than one document files are recorded, according to an instruction issued by a user; and outputting only a part of respective document files recorded in the selected memory area, in the list format according to a condition that is determined in advance.

According to a seventh aspect of the present invention, a computer readable recording medium has a data processing program stored therein to make a computer execute:

selecting one or more than one document files among those recorded in a memory, according to an instruction issued by a user;

judging whether by the simplified mode or the detailed mode the selected document should be outputted, according to an output condition that is determined in advance; and outputting the selected document file by the simplified mode or the detailed mode, according to the judgment result.

According to a eighth aspect of the present invention, a computer readable recording medium has a data processing program stored therein to make a computer execute:

selecting one or more than one document files among those recorded in a memory, according to an instruction issued by a user who accesses from an external apparatus;

judging whether by the simplified mode or the detailed mode the selected document should be transmitted to the external apparatus, according to a type of the external apparatus; and transmitting the selected document to the external apparatus by the simplified mode or the detailed mode, according to the judgment result.

According to a ninth aspect of the present invention, a computer readable recording medium has a data processing program stored therein to make a computer execute:

selecting a memory area among one or more than one memory areas in which one or more than one document files are recorded, according to an instruction issued by a user; and outputting only a part of respective document files recorded in the selected memory area, in the list format according to a condition that is determined in advance.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 11-A is a view showing an assistance display setting screen, and FIG. 11-B is a view showing a BOX selection screen;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
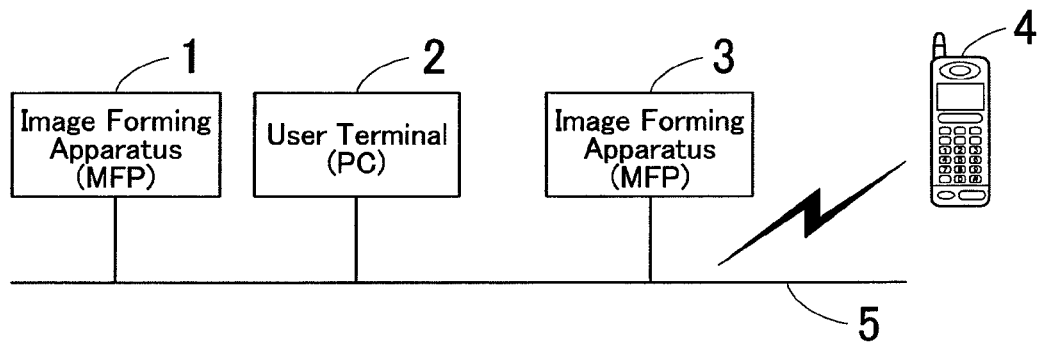
FIG. 1 is a diagram schematically showing a configuration of a network system that employs a data processing apparatus according to one embodiment of the present invention.

FIG. 1 is a view schematically showing a configuration of a network system that employs a data processing apparatus according to one embodiment of the present invention.

This network system comprises an image forming apparatus 1 as a data processing apparatus according to one embodiment of the present invention, a user terminal 2 that is a personal computer, another image forming apparatus 3, a cell-phone 4 and etc., and the user terminal 2, the image forming apparatus 3 and the cell-phone 4 are connected to the image forming apparatus 1 via a network 5.

In this embodiment, a MFP (Multi Function Peripheral) that is a multifunctional digital machine having the copy function, the print function, the facsimile function and other functions, is employed as the image forming apparatus 1. Also, a MFP is employed as the image forming apparatus 3.

Figure 2:
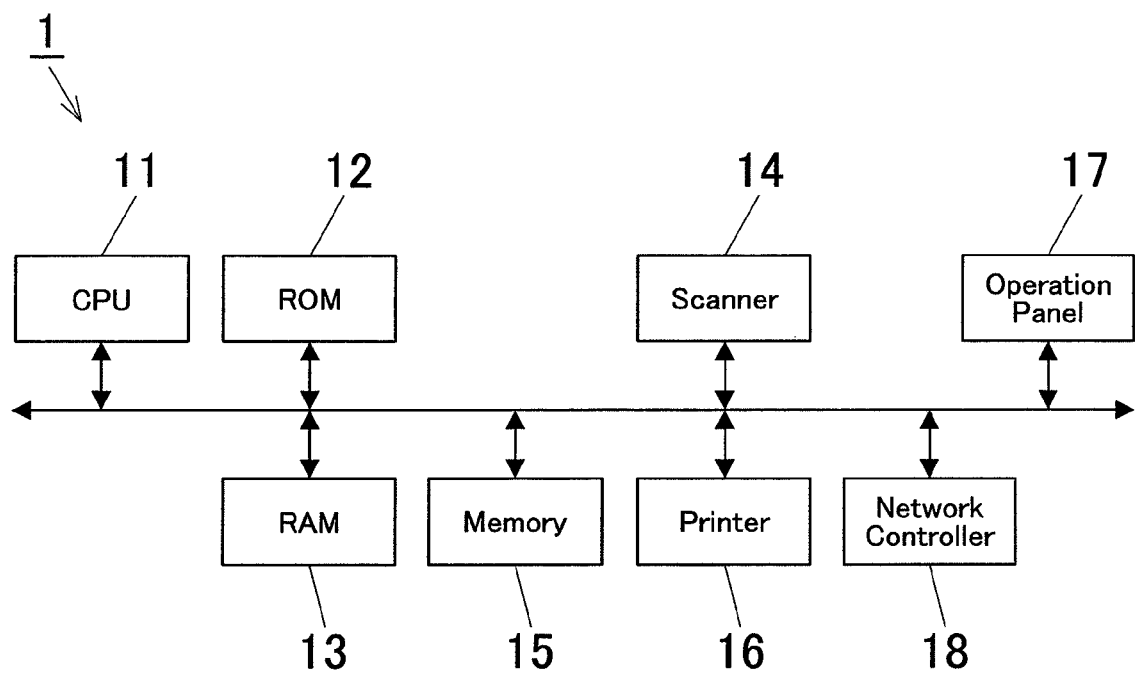
FIG. 2 is a block diagram schematically showing a configuration of an image forming apparatus.

FIG. 2 is a block diagram schematically showing a configuration of the image forming apparatus 1.

The image forming apparatus 1 comprises a CPU 11, a ROM 12, a RAM 13, a scanner 14, a memory 15, a printer 16, an operation panel 17, a network controller (NIC) 18, and etc.

The CPU 11 centrally controls the entire image forming apparatus 1. Specifically in this embodiment, as well as implementation of the copy function, the print function and the facsimile function as ordinarily expected as a CPU, the CPU 11 controls the following operations.

A document file (hereinafter, "document file" will be also referred to simply as "document") is selected among those recorded as data in the memory 15, according to user instruction. And it is judged whether by the simplified mode or the detailed mode the selected document should be outputted, according to a predetermined output condition. Then, according to the judgment result, the printer 16 is controlled so that the selected document could be outputted by the simplified mode or the detailed mode.

Furthermore, under the control of the CPU 11, if a document is selected according to an instruction issued by a user who accesses from an external apparatus such as the user terminal 2, the image forming apparatus 3 or the cell-phone 4, it is judged whether by the simplified mode or the detailed mode the selected document should be transmitted to the external apparatus, according to a type of the external apparatus. Then, according to the judgment result, the selected document is transmitted to the external apparatus via the network controller 18, by the simplified mode or the detailed mode.

Furthermore, under the control thereof, if a user selects one of a plurality of memory areas (hereinafter, a memory area will be also referred to as "BOX" created in the memory 15 and documents are recorded in the respective memory areas, the printer 16 is controlled so that only a part of respective documents recorded in the selected BOX could be outputted in the list format according to a predetermined condition.

The ROM 12 is a memory that stores in itself an operation program and etc. for the CPU 11. The RAM 13 is a memory that provides an operation area for the CPU 11 to execute the operation program.

The scanner 14 reads an image on a document placed on a document table (not shown in Figure) then converts it into image data.

The memory 15 is a hard disk drive (HDD) for example, and has various data recorded therein, such as image data read out by the scanner 14, image data received from external apparatuses, and an operation log (log information) of the image forming apparatus. Furthermore, one or more than one BOXes are created in the memory 15 as mentioned above, and one or more than one documents are stored in the respective BOXes. Some of the BOXes are personal ones that are owned by the respective users and can be accessed by the respective users only, and some of the BOXes are public ones that can be accessed by any users without limitation.

The printer 16 prints out image data read out from a document by the scanner 14, print data received from the user terminal 2, documents stored in the BOXes, and etc. according to a determined output condition.

The operation panel 17 is used to perform various entry operations, and displays screens, messages and etc. on itself. It comprises a key entry portion having numeric keys, a start key and other keys, and a display such as a liquid crystal display.

The network controller 18 controls communications with external apparatuses connected thereto via a network, such as the user terminal 2, the image forming apparatus 3 and the cell-phone 4.

Hereinafter, a procedure executed in the image forming apparatus 1 shown in FIG. 2, when a login user selects a document among a plurality of documents recorded in a BOX of the memory, will be explained with reference to a flowchart shown in FIG. 3. This procedure is executed by the CPU 11 according to a program recorded in a recording medium such as the ROM 12.

A user performs an operation to log in the image forming apparatus 1. Then in Step S01, a login process such as authentication is performed.

The login user selects a document among those stored in a BOX of the memory 15 and this user's selection is accepted. Thereby, under the control of the CPU 11, the selected document is determined in Step S02. In this embodiment, those stored in the BOX are PDF documents. However, the document format is not limited thereto, thus those stored in the BOX may be Word documents or other formats of documents.

Then in Step S03, a display format determination process is performed. In this display format determination process, it is judged whether by the simplified mode or the detailed mode the selected document should be displayed on the operation panel 17, according to a predetermined output condition. In this embodiment, the output condition relates to the user who selected the document and attributes of the document, and only a part of the document is displayed thereon by the simplified mode meanwhile the entirety of the document is displayed thereon by the detailed mode. The display format determination process will be further explained later.

Subsequently in Step S04, according to the judgment result drawn in the display format determination process in Step S03, it is judged whether only a part of the selected document should be displayed thereon (by the simplified mode), or alternatively the entirety of the selected document should be displayed thereon (by the detailed mode).

If only a part of the document should be displayed thereon (YES in Step S04), only a part of the document is displayed on the operation panel 17, in Step S05. In this embodiment, only a "bookmarker" part (title) of the PDF document is displayed thereon. Alternatively, only a drawing part of the PDF document may be displayed thereon, or both a title and a drawing thereof may be displayed thereon.

If the entirety of the document should be displayed thereon (NO in Step S04), the entirety of the document is displayed on the operation panel 17, in Step S06. If the entirety of the document cannot be displayed within the limited display space of the operation panel 17, the document is displayed thereon from the beginning thereof, as far as the display space permits.

Figure 3:
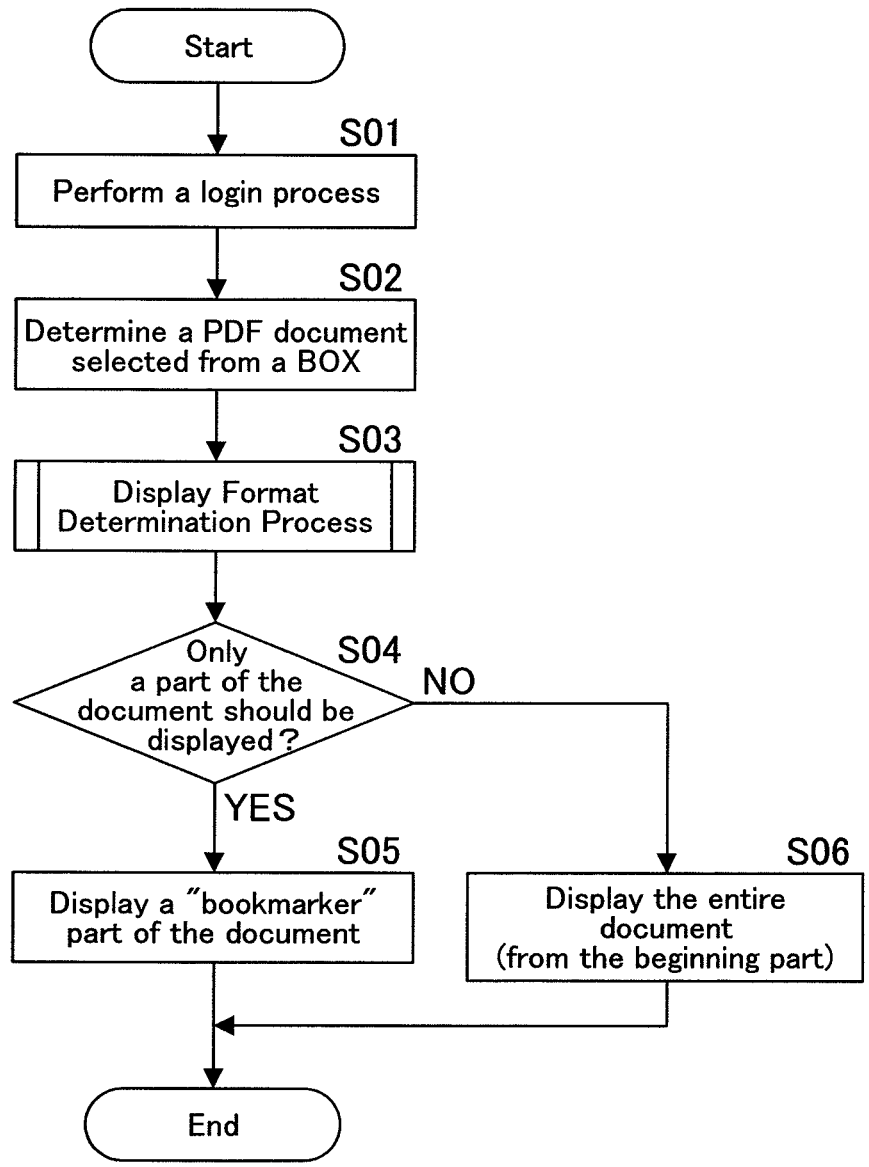
FIG. 3 is a flowchart representing a procedure that is executed in the image forming apparatus when a login user selects a document file among a plurality of document files stored as data in a BOX of a memory.
Figure 4:
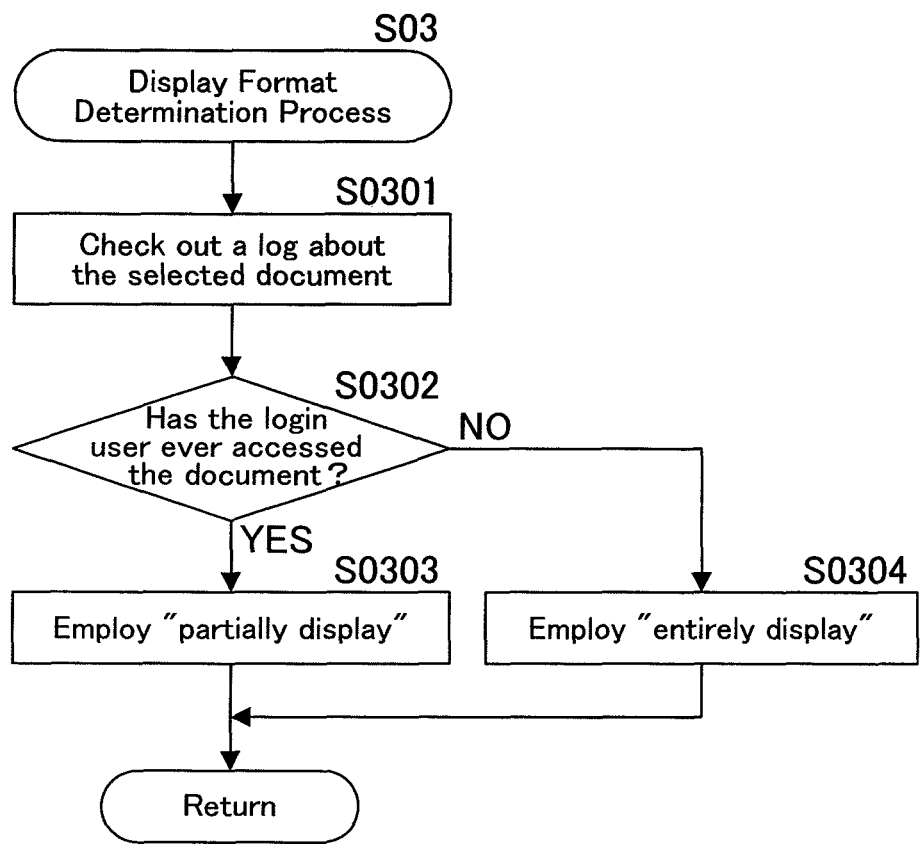
FIG. 4 is a flowchart representing a subroutine that corresponds to a display format determination process in Step S03 of FIG. 3.

FIG. 4 is a flowchart representing a subroutine that corresponds to a display format determination process in Step S03 of FIG. 3. In this embodiment, it is judged whether only a part or the entirety of the selected document should be displayed thereon, according to an access log proving whether or not the login user has ever accessed the document.

In Step S0301, under the control of the CPU 11, an operation log (log information) about the selected document is checked out. Then, it is judged in Step S0302 whether or not the login user has ever accessed the document.

If the user has ever accessed the document (YES in Step S0302), it is judged that "partially display" should be employed, in Step S0303, since it is supposed that the user already knows about the document. If the user has never accessed the document (NO in Step S0302), it is judged that "entirely display" should be employed, in Step S0304, since it is supposed that the user does not know about the document.

As described above in this embodiment, it is judged whether only a part or the entirety of a document selected according to a login user's instruction should be displayed thereon, according to an access log proving whether or not the login user has ever accessed the document. According to the judgment result, only a part or the entirety of the selected document is displayed on the document. In other words, by using the assistance function, only a part of the selected document can be outputted by the simplified mode, meanwhile the entirety of the document can be outputted by the detailed mode if the user would like to further know about the document for example. In this way, a document output format can be changed depending on users or etc., which would contribute to convenience a lot.

Figure 5:
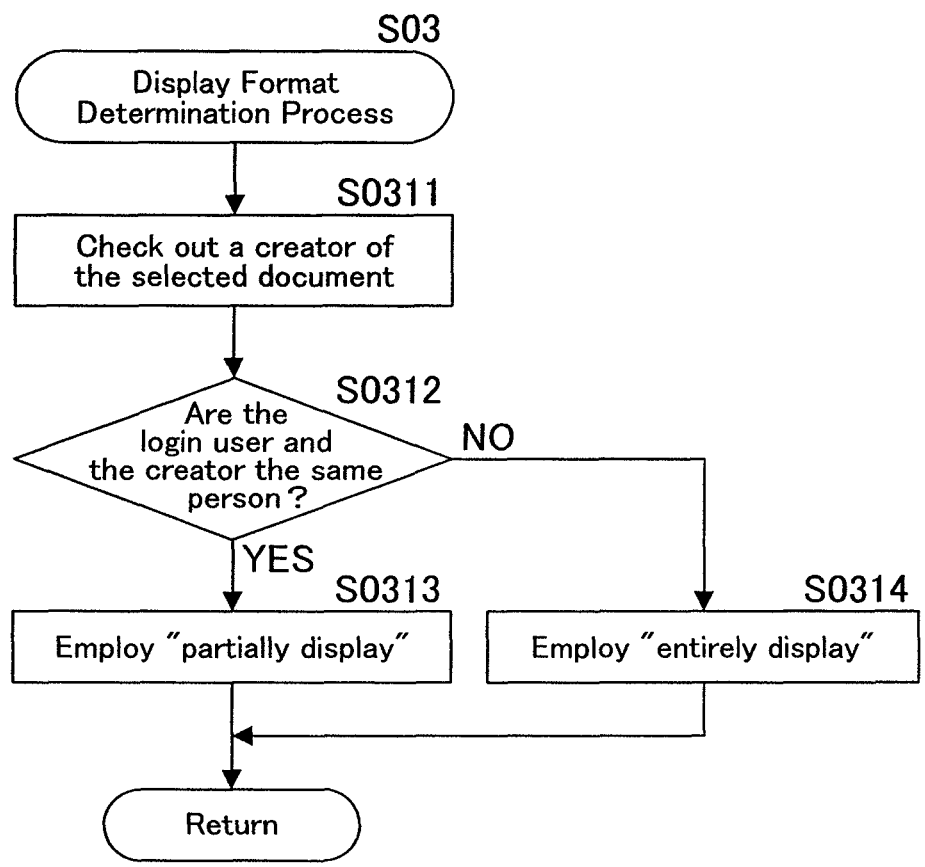
FIG. 5 is a flowchart representing another example of the display format determination process.

FIG. 5 is a flowchart representing another example of the display format determination process (Step S03 of FIG. 3). In this embodiment, a display format is determined according to whether or not the login user (the user who selected the document) and a creator of the selected document (the user who transmitted the document into the BOX) are the same person.

In Step S0311, a creator of the selected document is checked out. Then, it is judged in Step S0312 whether or not the login user and the document creator are the same person.

If the login user and the document creator are the same person (YES in Step S0312), it is judged that "partially display" should be employed, in Step S0313, since it is supposed that the user already knows about the document. If the login user and the document creator are not the same person (NO in Step S0312), it is judged that "entirely display" should be employed, in Step S0314, since it is supposed that the user does not know about the document. Then, according to the judgment result, only a part or the entirety of the document is displayed on the operation panel 17, in Step S05 or S06 of FIG. 3.

Figure 6:
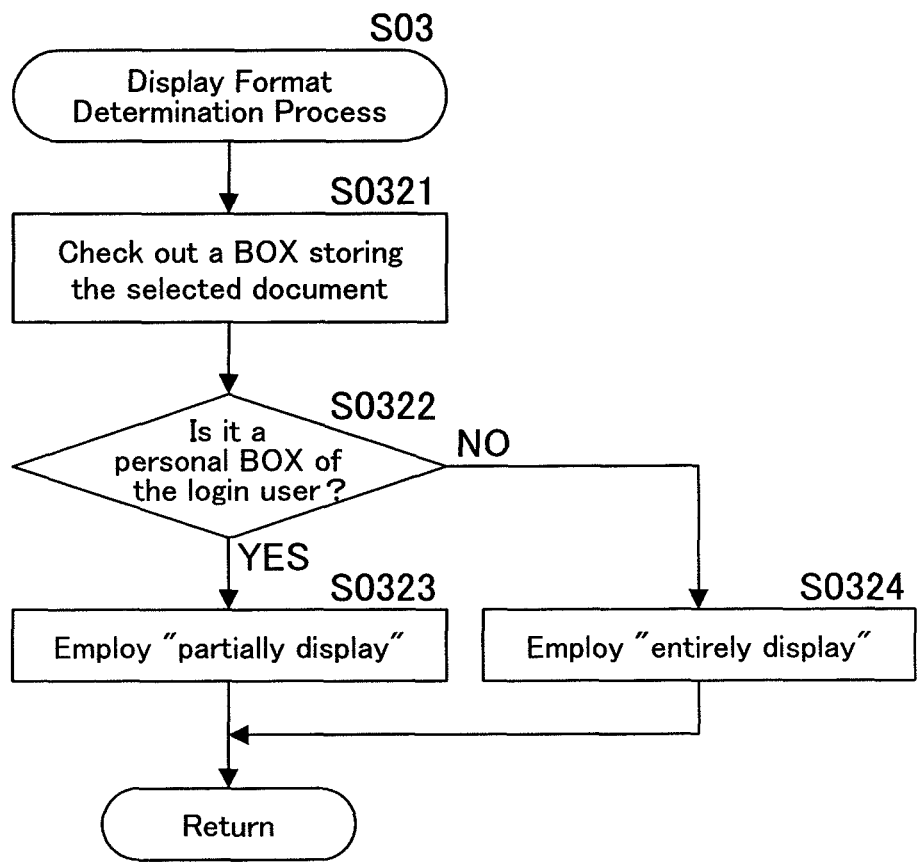
FIG. 6 is a flowchart representing yet another example of the display format determination process.

FIG. 6 is a flowchart representing yet another example of the display format determination process (Step S03 of FIG. 3). In this embodiment, a display format is determined according to whether or not the selected document is stored in a personal BOX of the login user.

In Step S0321, a BOX storing the selected document is checked out. Then, it is judged in Step S0322 whether or not it is a personal BOX of the login user.

If it is a personal BOX of the login user (YES in Step S0322), it is judged that "partially display" should be employed, in Step S0323, since it is supposed that the user already knows about the document. If it is not a personal BOX of the login user (NO in Step S0322), it is judged that "entirely display" should be employed, in Step S0324, since it is supposed that the user does not know about the document. Then, according to the judgment result, only a part or the entirety of the document is displayed on the operation panel 17, in Step S05 or S06 of FIG. 3.

Figure 7:
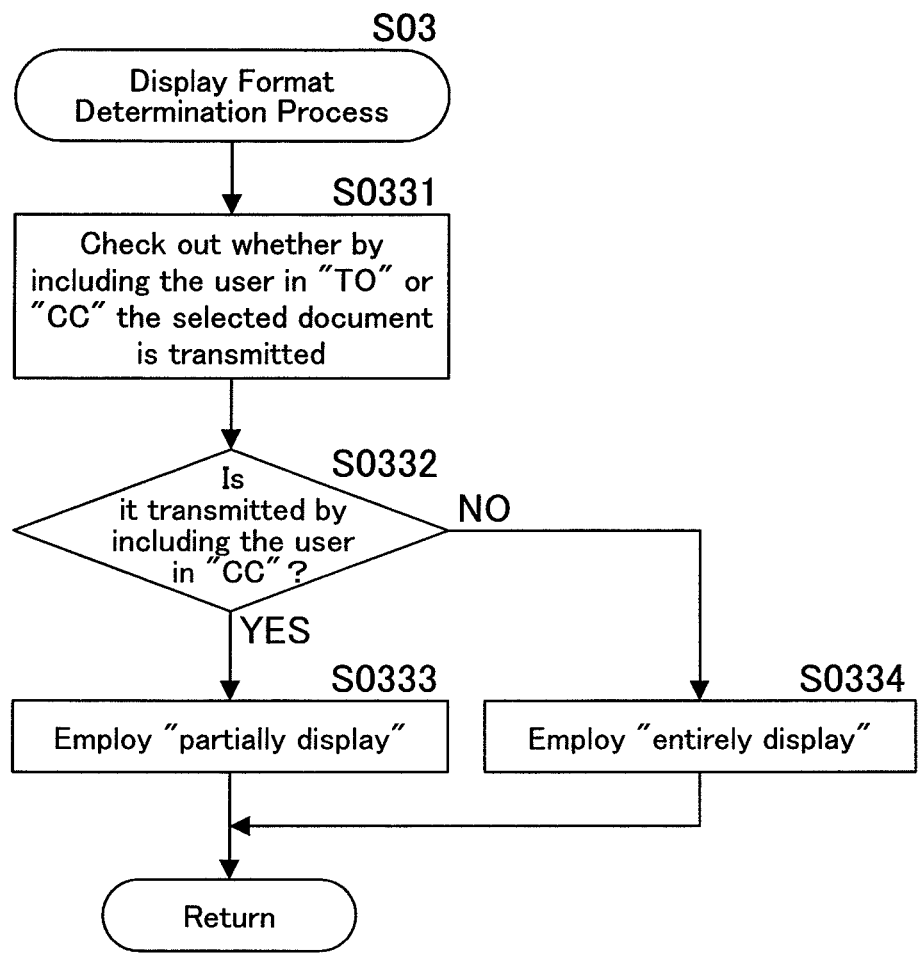
FIG. 7 is a flowchart representing still yet another example of the display format determination process.

FIG. 7 is a flowchart representing still yet another example of the display format determination process (Step S03 of FIG. 3). In this embodiment, a display format is determined according to whether the selected document was transmitted from an external apparatus by e-mail or etc., to the user who selected the document in a direct manner, e.g. by including this user in "TO", or alternatively, the selected document was transmitted from an external apparatus as a copy of a document directed to a third person, to the user who selected the document, e.g. by including this user in "CC".

In Step S0331, it is checked whether by including the user in "TO" or "CC" the selected document is transmitted. Then, it is judged in Step S0332 whether or not it was transmitted by including the user in "CC".

If it was transmitted by including the user in "CC" (YES in Step S0332), it is judged that "partially display" should be employed, in Step S0333, since it is supposed that the document is not very important for the user. If it was transmitted by including the user in "TO" (NO in Step S0332), it is judged that "entirely display" should be employed, in Step S0334, since it is supposed that the document is important for the user. Then, according to the judgment result, only a part or the entirety of the document is displayed on the operation panel 17, in Step S05 or S06 of FIG. 3.

Figure 8:
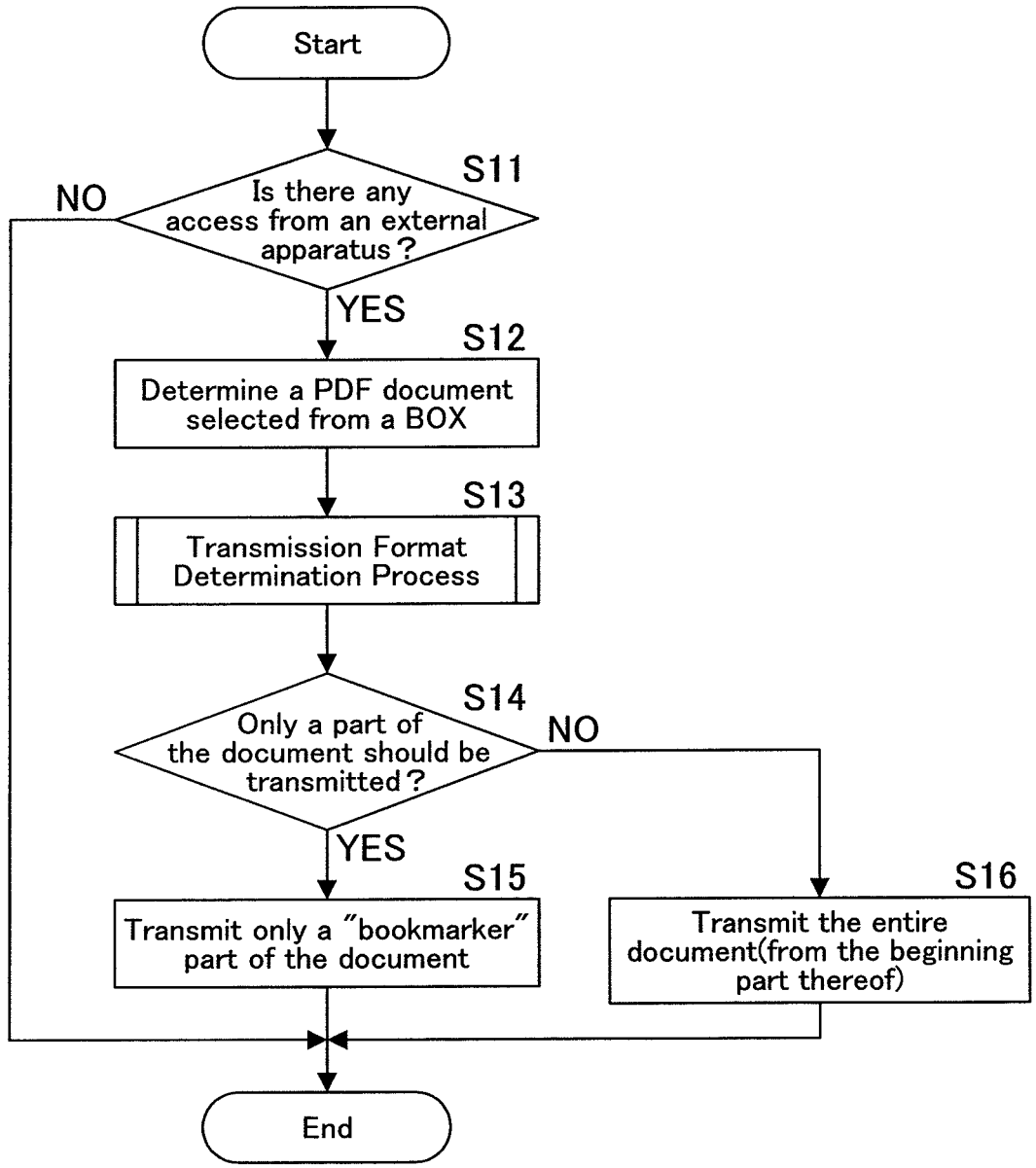
FIG. 8 shows another embodiment of the present invention, and is a flowchart representing a procedure that is executed in the image forming apparatus when a user accesses the image forming apparatus from an external apparatus then selects a document file stored in a BOX thereof.

FIG. 8 shows another embodiment of the present invention, and is a flowchart representing a procedure that is executed in the image forming apparatus 1 when a user accesses the image forming apparatus 1 from an external apparatus such as the user terminal 2, the image forming apparatus 3 or the cell-phone 4, then selects a document recorded in a BOX thereof. This procedure is executed by the CPU 11 according to a program recorded in a recording medium such as the ROM 12.

In Step S11, under the control of the CPU 11, it is judged whether or not there is any access from an external apparatus. If there is no access from an external apparatus (NO in Step S11), the routine terminates. If there is an access from an external apparatus (YES in Step S11), a user's selection is accepted. Thereby, under the control of the CPU 11, the selected PDF document is determined in Step S12. However, the selected document is not limited to a PDF document.

Then in Step S13, a transmission format determination process is performed. In this transmission format determination process, it is judged whether by the simplified mode or the detailed mode the selected document should be transmitted to the external apparatus that the user accesses from, according to a type of the external apparatus. Only a part of the document is transmitted thereto by the simplified mode, meanwhile the entirety of the document is transmitted thereto by the detailed mode. The transmission format determination process will be further explained later.

Subsequently in Step S14, according to the judgment result drawn in the transmission format determination process in Step S13, it is judged whether only a part of the selected document (the simplified mode) or the entirety of the selected document (the detailed mode) should be transmitted thereto.

If only a part of the document should be transmitted thereto (YES in Step S14), only a part of the document is transmitted to the external apparatus, in Step S15. In this embodiment, only a "bookmarker" part (title) of the PDF document is transmitted thereto. Alternatively, only a drawing part of the PDF document may be transmitted thereto, or both a title and a drawing thereof may be transmitted thereto.

If the entirety of the document should be transmitted thereto (NO in Step S14), the entirety of the document is transmitted to the external apparatus from the beginning thereof, in Step S16.

Figure 9:
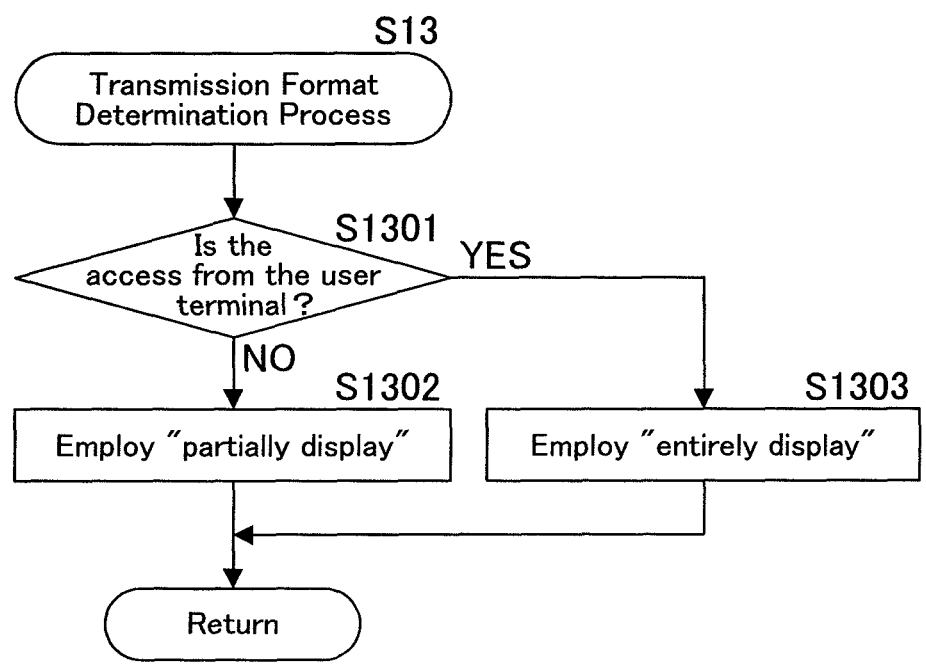
FIG. 9 is a flowchart representing a subroutine that corresponds to a transmission format determination process in Step S13 of FIG. 8.

FIG. 9 is a flowchart representing a subroutine that corresponds to the transmission format determination process in Step S13 of FIG. 8. In this embodiment, it is judged whether only a part or the entirety of the document should be displayed thereon, according to whether or not the user accesses the image forming apparatus 1 from the user terminal 2 that is a personal computer.

In Step S1301, under the control of the CPU 11, it is judged whether or not the access to the image forming apparatus 1 is from the user terminal 2. If the access is not from the user terminal 2 (No in Step S1301), it is judged that "partially display" should be employed, in Step S1302, since it is supposed that the access is received from the image forming apparatus 3 or the cell-phone 4 and the operation panel loaded on the image forming apparatus 3 or the cell-phone 4 is rather small, and accordingly it would be preferred that the amount of data to be displayed thereon is small. If the access is received from the user terminal 2 (YES in Step S1301), it is judged that "entirely display" should be employed, in Step S1303, since it is supposed that the user terminal 2 is a personal computer loading a display apparatus which display space is large enough to display the entirety of the document.

And then, according to the judgment result, only a part or the entirety of the selected document is transmitted to the external apparatus that the user accesses from.

Figure 10:
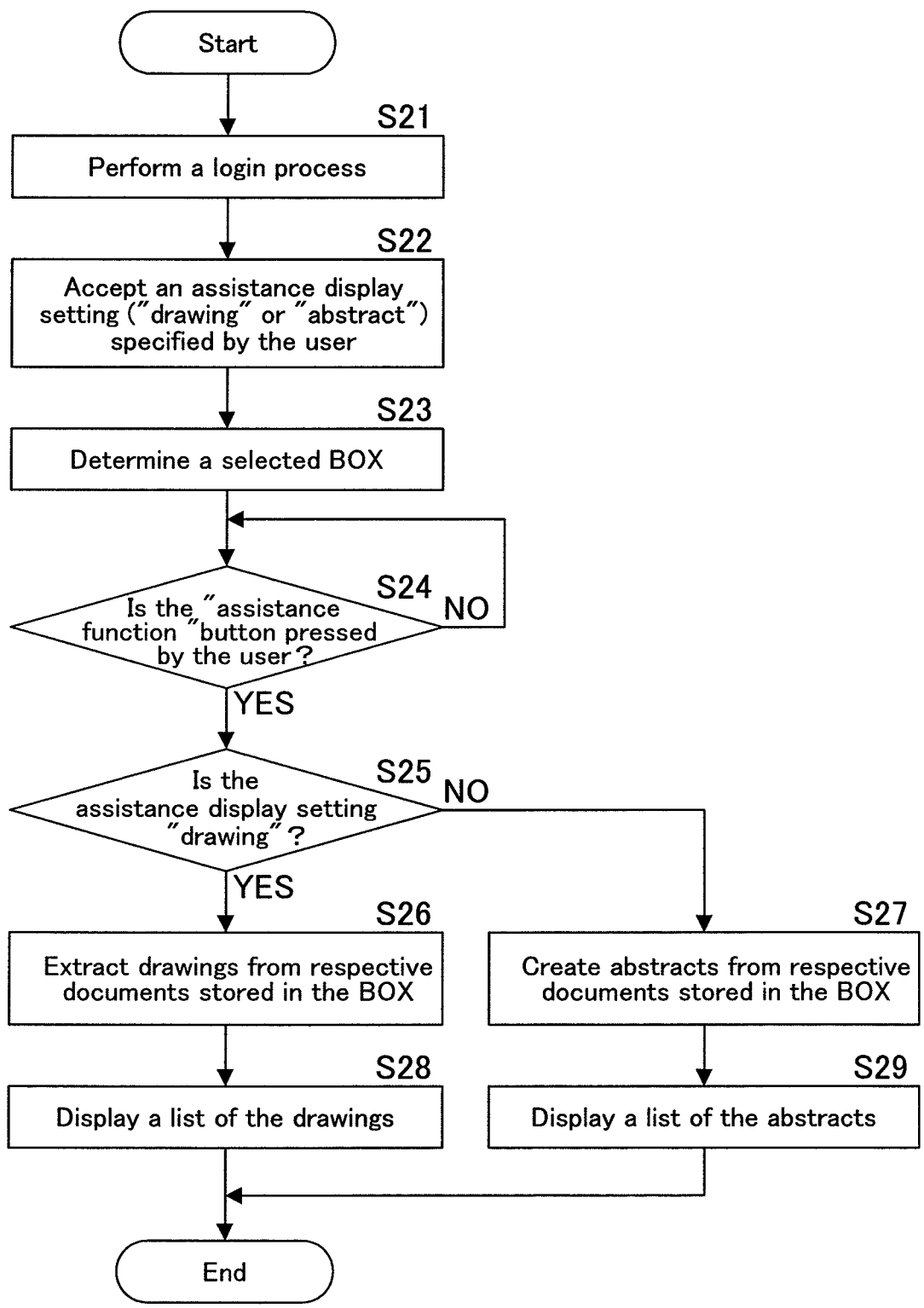
FIG. 10 shows to yet another embodiment of the present invention, and is a flowchart representing a procedure that is executed in the image forming apparatus, to output only a part of one or more than one respective document files stored in a user's preferable BOX, in the list format according to a predetermined condition, when he/she selects the BOX.

FIG. 10 shows yet another embodiment of the present invention, and is a flowchart representing a procedure that is executed in the image forming apparatus 1, to output only a part of one or more than one respective documents stored in a user's preferable BOX, in the list format according to a predetermined condition, when he/she selects the BOX. This procedure is executed by the CPU 11 according to a program recorded in a recording medium such as the ROM 12.

A user performs an operation to log in the image forming apparatus 1. Then in Step S21, a login process is performed.

After logging-in, the user presses an "assistance setting" button via a menu displayed on the operation panel, which is not shown in Figure. Then, the screen on the operation panel 17 is switched to an assistance display setting screen shown in FIG. 11(A). In this screen, a "drawing" button and an "abstract" button are displayed, as well as messages telling that the screen is for assistance display setting and requesting to press the "drawing" button or the "abstract" button.

Accordingly, the user presses the "drawing" button or the "abstract" button. Then in Step S22, this action is accepted and the screen on the operation panel 17 is switched to a BOX selection screen shown in FIG. 11(B).

In the BOX selection screen, a list of available BOXes and an "assistance function" button are displayed, as well as a message requesting to select a BOX then press the "assistance function" button. In FIG. 11(B), the BOX A is selected for example.

Accordingly, the user selects a BOX. Then, under the control of the CPU 11, the selected BOX is determined in Step S23, and it is judged in Step S24 whether or not the "assistance function" button is pressed.

If the "assistance function" button is not pressed (NO in Step S24), the routine waits until it is pressed. If the "assistance function" button is pressed (YES in Step S24), then it is judged in Step S25 whether the assistance display setting accepted in Step S22 is "drawing".

Figure 12:
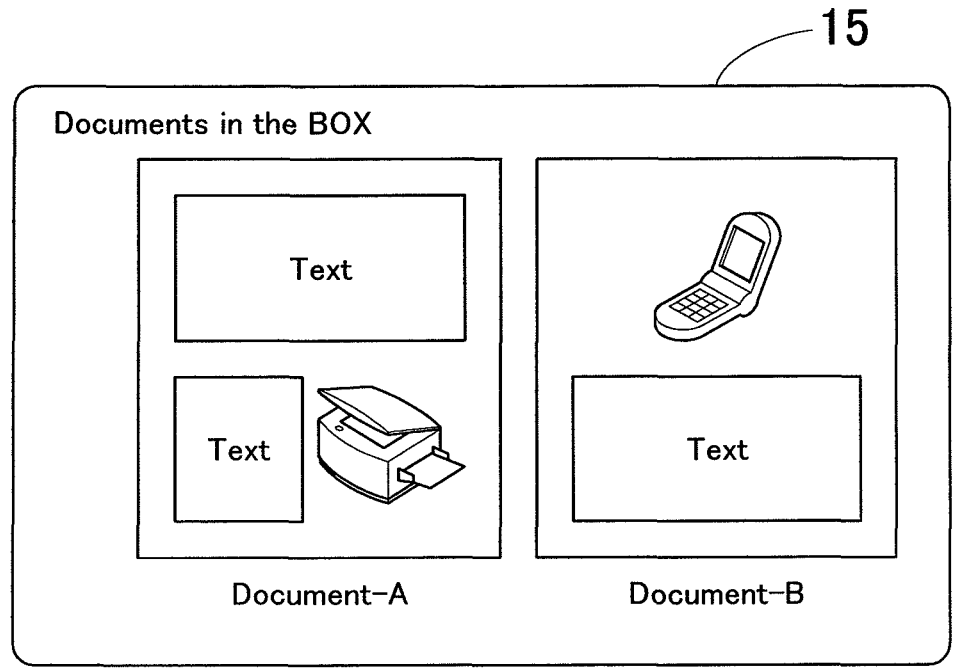
FIG. 12 is a view showing an example a document file stored in a selected BOX.
Figure 13:
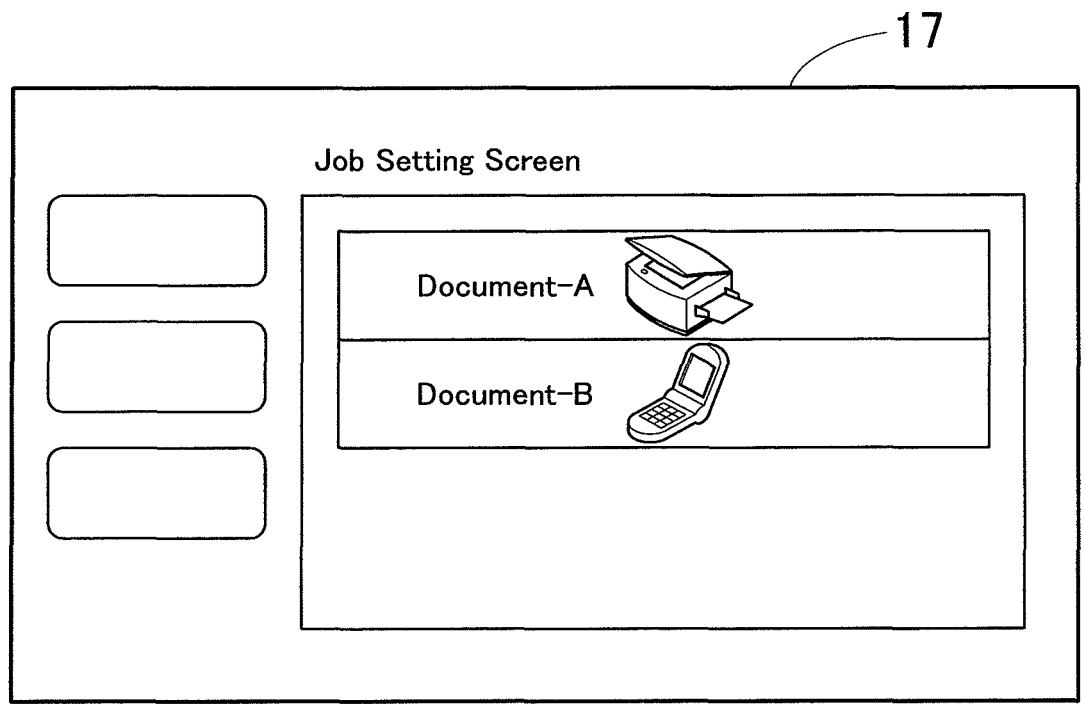
FIG. 13 is a view showing a screen on an operation panel, displaying in itself a list of extracted drawings.

If it is "drawing" (YES in Step S25), drawings are extracted from documents stored in the selected BOX (FIG. 12 shows an example), in Step S26. In FIG. 12, a drawing representing an image forming apparatus is extracted from a document A, and another drawing representing a cell-phone is extracted from a document B, for example.

After drawing extraction, the extracted drawings are displayed in the list format, in Step S28.

Meanwhile in Step S25, if the accepted assistance display setting is not "drawing" (NO in Step S25), abstracts are created from the respective documents stored in the selected BOX. This abstract creation operation is performed by using an application for abstract creation, which is preliminarily installed on the image forming apparatus 1.

Then in Step S29, the created abstracts are displayed in the list format on the operation panel 17.

And the user is required only to select a preferable document from the list of the drawings or the abstracts displayed on the operation panel 17, in order to execute a job such as a print job.

As described above in this embodiment, when a user selects a BOX, drawings or abstracts of respective documents stored in the selected BOX are displayed in the list format. Thus, by using the assistance function, users can be released from the troubles that they are required to select the documents stored in the selected BOX, one by one, when they try to find out a preferable document among those stored therein.

Each of the embodiments explained above relates to one embodiment of the present invention. However, the present invention is not limited to these embodiments.

For example, in these embodiments, only a part or the entirety of a document is displayed on the operation panel 17. Alternatively, only a part or the entirety of a document may be printed out by the printer 16. Furthermore, if only a part or the entirety of a document is text data, it may be outputted by voice by an audio reproducer such as a speaker. Furthermore, when only a part or the entirety of a document is transmitted to an external apparatus, the data may be displayed on a display apparatus of the external apparatus, may be printed out by the external apparatus, or may be outputted by voice by the external apparatus.

Furthermore, in these embodiments, only a part of a document is displayed (outputted) by the simplified mode, meanwhile the entirety of a document is displayed (outputted) by the detailed mode. However, the simplified mode and the detailed mode can be configured to obtain any document display (output) formats, as long as their document display (output) formats are different to each other.

Furthermore, these embodiments can be configured such that if a login user specifies a URL (Uniform Resource Locator) via a browser then accesses a document stored in an external apparatus or etc. from the image forming apparatus 1, the CPU 11 of the image forming apparatus 1 checks out an access log proving accesses of the login user, and if the user has ever viewed the document referred by the URL (if the user has ever accessed), the access log is displayed by the simplified mode, meanwhile if the user has never viewed the document (if the user has never accessed), only a part of the document is displayed by the detailed mode. Specifically in this case, if the user has ever viewed the document but the document has been updated since his/her last access, it would be preferred that only an updated part of the document is displayed thereon.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. A data processing apparatus comprising:
   a memory that records in itself one or more than one document files;
   a selector that selects a document file among those recorded in the memory, according to an instruction issued by a user;
   an output portion that is capable of outputting document files; and
   a controller to:
   determine whether or not an access log proves that the user who issues an instruction to select the document file has ever accessed the selected document file;
   judge that the selected document file should be outputted by the output portion by a simplified mode that is designed to allow the output portion to output only a part of the document file, if the access log proves that the user has ever accessed the selected document file;
   judge that the selected document file should be outputted by the output portion by a detailed mode that is designed to allow the output portion to output the entirety of the document file, if the access log does not prove that the user has ever accessed the selected document file; and
   make the output portion output the selected document file either by the simplified mode or by the detailed mode depending on the judgment result.

2. The data processing apparatus recited in claim 1, wherein at least either a document title or a drawing included in the document file is outputted thereon by the simplified mode.

3. The data processing apparatus recited in claim 1, wherein the output portion corresponds to a display that is capable of displaying document files on itself.

4. A data processing apparatus comprising:
   a memory that records in itself one or more than one document files;
   a selector that selects a document file among those recorded in the memory, according to an instruction issued by a user;
   an output portion that is capable of outputting document files;
   and
   a controller to:
   determine whether or not the user who issues an instruction to select the document file and a creator of the selected document file are the same person;
   judge that the selected document file should be outputted by the output portion by a simplified mode that is designed to allow the output portion to output only a part of the document file, if the user who issues an instruction to select the document file and a creator of the selected document file are the same person;
   judge that the selected document file should be outputted by the output portion by a detailed mode that is designed to allow the output portion to output the entirety of the document file, if the user who issues an instruction to select the document file and a creator of the selected document file are not the same person; and
   make the output portion output the selected document file either by the simplified mode or by the detailed mode depending on the judgment result.

5. A data processing apparatus comprising:
   a memory that records in itself one or more than one document files;
   a selector that selects a document file among those recorded in the memory, according to an instruction issued by a user;
   an output portion that is capable of outputting document files;
   and
   a controller to:
   determine whether or not the selected document file is recorded in the personal memory area of the memory of the user who issues an instruction to select the document file;

judge that the selected document file should be outputted by the output portion by a simplified mode that is designed to allow the output portion to output only a part of the document file, if the selected document file is recorded in this user's own personal memory area of the memory;

judge that the selected document file should be outputted by the output portion by a detailed mode that is designed to allow the output portion to output the entirety of the document file, if the selected document file is not recorded in this user's own personal memory area of the memory; and make the output portion output the selected document file either by the simplified mode or by the detailed mode depending on the judgment result.

6. A data processing method comprising:

selecting one or more than one document files among those recorded in a memory, according to an instruction issued by a user;

determining whether or not an access log proves that the user who issues an instruction to select the document file has ever accessed the selected document file;

judging that the selected document file should be outputted by the output portion by a simplified mode that is designed to allow the output portion to output only a part of the document file, if the access log proves that the user has ever accessed the selected document file;

judging that the selected document file should be outputted by the output portion by a detailed mode that is designed to allow the output portion to output the entirety of the document file, if the access log does not prove that the user has ever accessed the selected document file; and outputting the selected document file either by the simplified mode or by the detailed mode depending on the judgment result.

7. A non-transitory computer readable recording medium having a data processing program recorded therein to make a computer execute:

selecting one or more than one document files among those recorded in a memory, according to an instruction issued by a user;

determining whether or not an access log proves that the user who issues an instruction to select the document file has ever accessed the selected document file;

judging that the selected document file should be outputted by the output portion by a simplified mode that is designed to allow the output portion to output only a part of the document file, if the access log proves that the user has ever accessed the selected document file;

judging that the selected document file should be outputted by the output portion by a detailed mode that is designed to allow the output portion to output the entirety of the document file, if the access log does not prove that the user has ever accessed the selected document file; and outputting the selected document file either by the simplified mode or by the detailed mode depending on the judgment result.

8. A data processing method comprising:

selecting one or more than one document files among those recorded in a memory, according to an instruction issued by a user;

determining whether or not the user who issues an instruction to select the document file and a creator of the selected document file are the same person;

judging that the selected document file should be outputted by the output portion by a simplified mode that is designed to allow the output portion to output only a part of the document file, if the user who issues an instruction to select the document file and a creator of the selected document file are the same person;

judging that the selected document file should be outputted by the output portion by a detailed mode that is designed to allow the output portion to output the entirety of the document file, if the user who issues an instruction to select the document file and a creator of the selected document file are not the same person; and outputting the selected document file either by the simplified mode or by the detailed mode depending on the judgment result.

9. A non-transitory computer readable recording medium having a data processing program recorded therein to make a computer execute:

selecting one or more than one document files among those recorded in a memory, according to an instruction issued by a user;

determining whether or not the user who issues an instruction to select the document file and a creator of the selected document file are the same person;

judging that the selected document file should be outputted by the output portion by a simplified mode that is designed to allow the output portion to output only a part of the document file, if the user who issues an instruction to select the document file and a creator of the selected document file are the same person;

judging that the selected document file should be outputted by the output portion by a detailed mode that is designed to allow the output portion to output the entirety of the document file, if the user who issues an instruction to select the document file and a creator of the selected document file are not the same person; and and outputting the selected document file either by the simplified mode or by the detailed mode depending on the judgment result.

10. A data processing method comprising:

selecting one or more than one document files among those recorded in a memory, according to an instruction issued by a user;

determining whether or not the selected document file is recorded in the personal memory area of the memory of the user who issues an instruction to select the document file;

judging that the selected document file should be outputted by the output portion by a simplified mode that is designed to allow the output portion to output only a part of the document file, if the selected document file is recorded in this user's own personal memory area of the memory;

judging that the selected document file should be outputted by the output portion by a detailed mode that is designed to allow the output portion to output the entirety of the document file, if the selected document file is not recorded in this user's own personal memory area of the memory; and outputting the selected document file either by the simplified mode or by the detailed mode depending on the judgment result.

11. A non-transitory computer readable recording medium having a data processing program recorded therein to make a computer execute:

selecting one or more than one document files among those recorded in a memory, according to an instruction issued by a user;

determining whether or not the selected document file is recorded in the personal memory area of the memory of the user who issues an instruction to select the document file;

judging that the selected document file should be outputted by the output portion by a simplified mode that is designed to allow the output portion to output only a part of the document file, if the selected document file is recorded in this user's own personal memory area of the memory;

judging that the selected document file should be outputted by the output portion by a detailed mode that is designed to allow the output portion to output the entirety of the document file, if the selected document file is not recorded in this user's own personal memory area of the memory; and;

outputting the selected document file either by the simplified mode or by the detailed mode depending on the judgment result.

* * * * *